(12) United States Patent
Chi

(10) Patent No.: US 6,204,574 B1
(45) Date of Patent: Mar. 20, 2001

(54) BACKUP POWER-SUPPLY DEVICE

(75) Inventor: Tse-Hua Chi, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 09/392,009

(22) Filed: Sep. 8, 1999

(30) Foreign Application Priority Data

Feb. 3, 1999 (TW) .................................................. 88201802

(51) Int. Cl.[7] ............................................................ H02J 7/00
(52) U.S. Cl. ................................................... 307/66; 307/43
(58) Field of Search ................................. 307/43, 46, 45, 307/49, 65, 64, 66, 72, 75, 25, 26, 73

(56) References Cited

U.S. PATENT DOCUMENTS 5,811,895 * 9/1998 Suzuki et al. ......................... 307/125
5,874,788 * 2/1999 McCartney ............................ 307/66
5,955,797 * 9/1999 Kim ....................................... 307/150

\* cited by examiner

Primary Examiner—Josie Ballato
Assistant Examiner—Robert L. Deberadinis
(74) Attorney, Agent, or Firm—Alston & Bird LLP

(57) ABSTRACT

A backup power-supply device is provided. The backup power-supply device can supply a DC power to an electric appliance when an external power source electrically connected to the electric appliance is interrupted. The backup power-supply device can sustain supplying the DC power for at least three to five minutes so that the operation of the electric appliance will not be interrupted during the power outage.

11 Claims, 5 Drawing Sheets

BACKUP POWER-SUPPLY DEVICE

FIELD OF THE INVENTION

The present invention relates to a backup-power supply device, and more particularly to a backup power-supply device which is able to supply a DC power when the power supplied to an electric appliance is interrupted.

BACKGROUND OF THE INVENTION

Owing to the promotion of the personal computer (PC), the backup power-supply device is becoming significant. Nowadays, the representative backup power-supply device is the uninterruptible power system (UPS). The UPS is usually designed to have AC power output for supplying power for a period of time when a power outage occurs. Hence, the UPS is able to sustain supplying the power to an electric appliance during the power outage so that the electric appliance can operate without interruption. The UPS is usually employed in a complicated and large-scale electric appliance that can not be interrupted during the power outage, for example, a workstation. Therefore, the cost of UPS must be relatively high.

Referring to FIG. 1, a power supply 13 of a PC 11 includes an electromagnetic interference filter 131, an AC/DC converter 132, a DC/DC converter 133, and a feedback control circuit 134. If a high-level operating system, such as Windows 95/98, Windows NT, UNIX and so forth, is running on a PC, some serious damages like data loss may occur during the power outage.

Therefore, a UPS is needed to cooperate with a PC for supplying a backup power during the power outage. However, the UPS at least includes an electromagnetic interference filter 121, an AC/DC converter 122, a DC/AC converter 123, a charger 124, and a rechargeable battery cell 125. The UPS is quite complicated and it is not practical for a PC because the users of a PC are mainly involved in the fields of application and entertainment, whereas the users of a workstation are mainly involved in the fields of research and development. Actually, a PC needs only three to five minutes for proceeding the data storage and shutdown processes during the power outage. Therefore, it is desirable to develop a backup power-supply device which can provide enough power for storing data and shutting down the PC.

SUMMARY OF THE INVENTION

Therefore, an object of the present invention is to provide a backup power-supply device for supplying backup power for at least three to five minutes so that the electric appliance can be operated without interruption during the power outage.

Another object of the present invention is to provide a cheap and practical backup power-supply device for a personal computer.

According to the present invention, the backup power-supply device needs to cooperate with an electric appliance having a power supply with a first receptacle and a second receptacle. The first receptacle is used for receiving power from an external power source when the electric appliance is under a normal power-supply state.

The backup power-supply device includes an input terminal, an output terminal, a power-accumulating unit, a charger, a DC/DC converter, and a detecting circuit. The input terminal is electrically connected to the external power source for receiving power from the external power source. The output terminal is electrically connected to the second receptacle of the power supply. The power-accumulating unit is used for accumulating the backup power therein when the electric appliance is under the normal power-supply state and releasing the backup power when the external power source fails to supply power. The charger is electrically connected between the input terminal and the power-accumulating unit for charging the power-accumulating unit when the electric appliance is under the normal power-supply state. The DC/DC converter is electrically connected between the power-accumulating unit and the output terminal for converting a low-level direct current signal outputted from the power-accumulating unit into a high-level direct current signal provided for the electrical appliance through the output terminal and the second receptacle of the power supply, and the detecting circuit which is electrically connected to the input terminal, the charger, and the DC/DC converter and detecting the power from the external power source for having the DC/DC converter release the backup power to the electric appliance when the external power source fails to supply power Preferably, the power-accumulating unit is a rechargeable battery cell, and the external power source is a utility power source.

Certainly, the electric appliance is a personal computer, more preferably a desktop personal computer.

Generally, there are two selections for connecting the second receptacle of the power supply. One way is to connect the second receptacle of the power supply directly to an output terminal of an AC/DC converter built in the power supply, and the other way is to connect the second receptacle of the power supply directly to an output terminal of an DC/DC converter built in the power supply.

Certainly, the first receptacle of the power supply is directly electrically connected to the external power source by an external conducting wire, and serves as an input terminal for the external power source.

In accordance with another aspect of the present invention, the power-accumulating unit can sustain releasing the backup power for at least three to five minutes.

In another embodiment of the present invention, the backup power-supply device includes an input terminal, a first output terminal, a second output terminal, a power-accumulating unit, a charger, a DC/DC converter, and a detecting circuit. The input terminal is electrically connected to the external power source for receiving power from the external power source. The first output terminal is electrically connected to the second receptacle of the power supply. The second output terminal is electrically connected to the first receptacle of the power supply. The power-accumulating unit is used for accumulating the backup power therein when the electric appliance is under the normal power-supply state and releasing the backup power when the external power source fails to supply power. The charger is electrically connected between the input terminal and the power-accumulating unit for charging the power-accumulating unit when the electric appliance is under the normal power-supply state. The DC/DC converter is electrically connected between the power-accumulating unit and the first output terminal for converting a low-level direct current signal outputted from the power-accumulating unit into a high-level direct current signal provided for the electrical appliance through the first output terminal and the second receptacle of the power supply, and the detecting circuit which is electrically connected to the input terminal, the charger, and the DC/DC converter and detecting the power from the external power source for having the DC/DC converter release the backup power to the electric appliance when the external power source fails to supply power.

In this preferred embodiment, the electric appliance has a power supply with a first receptacle and a second receptacle, but the first receptacle does not connect to the external power source.

Now The present invention may best be understood through the following descriptions with reference to the accompanying drawings, in which:

DETAILED DESCRIPTION OF THE PREFERRED EMBODIMENTS

The present invention will now be described more minutely with reference to the following embodiment. It is to be noted that the following descriptions of preferred embodiment of this invention are presented herein for the purpose of illustration and description only. It is not intended to be exhaustive or not to be restricted to the precise form disclosed.

Figure 1:
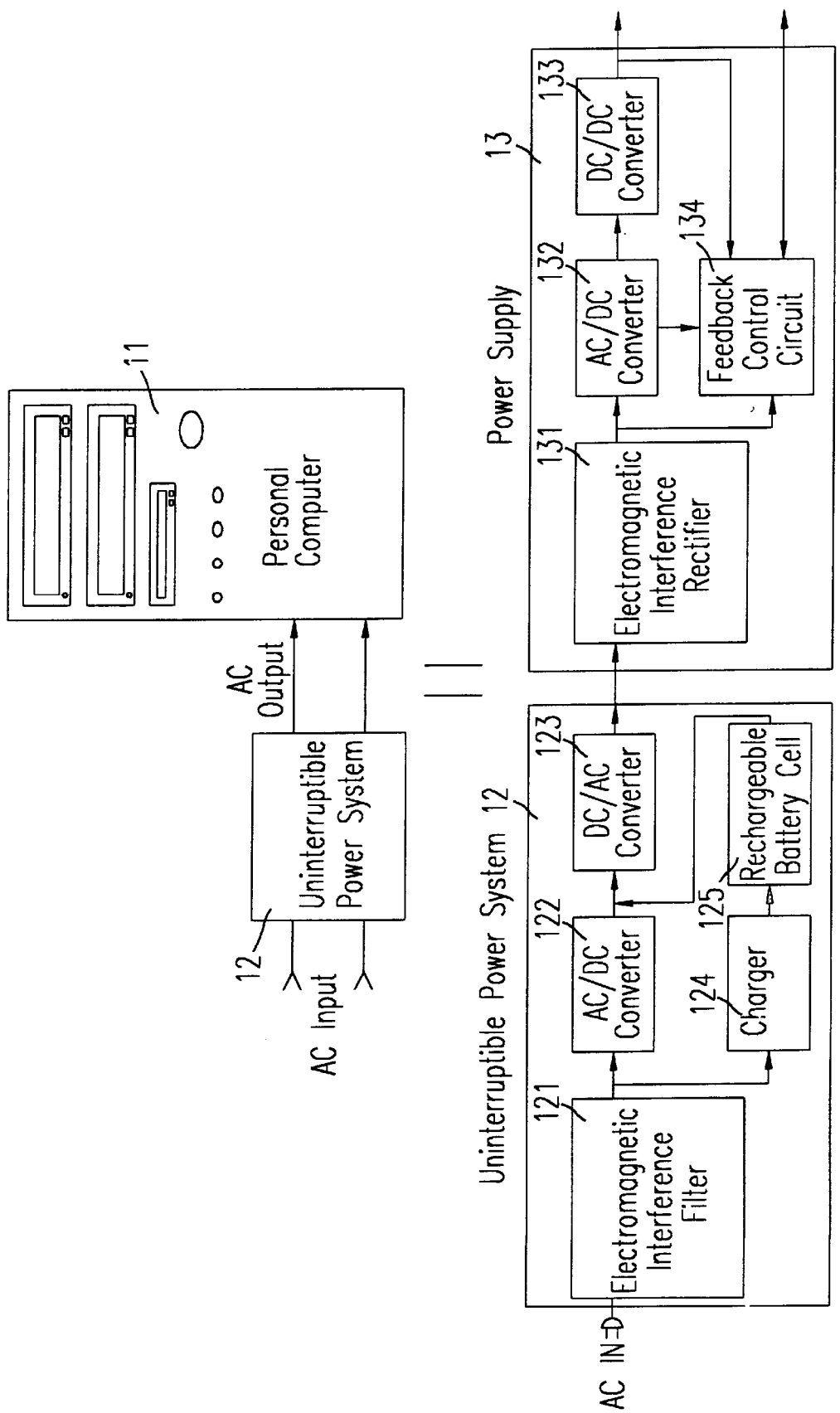
FIG. 1 is a block diagram of the uninterruptible power system connected with the power supply of a PC.
Figure 2A:
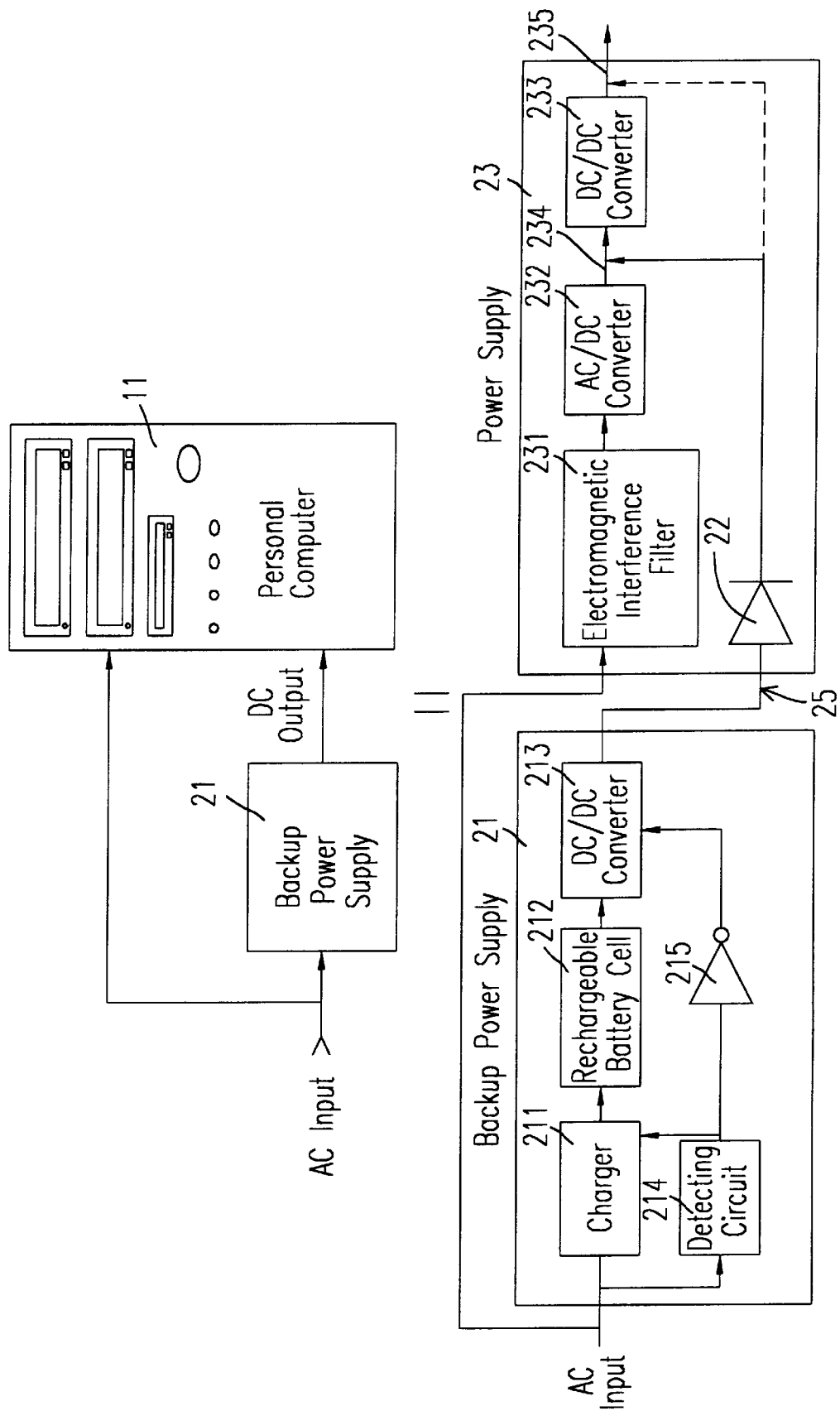
FIG. 2(a) is a block diagram of a backup power-supply device of a preferred embodiment according to the present invention connected with the power supply of a PC.

Please refer to FIG. 2(a). The electric appliance in this preferred embodiment is a personal computer. The backup-power supply 21 is connected in parallel with the power supply 23 of the PC for supplying backup power to the PC when the power outage occurs.

The power supply 23 of the PC, however, has an additional input terminal 25. The input terminal 25 is connected to the high-voltage DC terminal 234 or the low-voltage DC terminal 235 through a unidirectional device such as a diode.

The backup power-supply device 21 starts to operate when the power supplied to the electric appliance is interrupted. At the same time, the electromagnetic interference filter 231 and the AC/DC converter 232 cease operating. Meanwhile, the direct current outputted from the backup power-supply device 21 can be inputted to the DC terminal of the power supply 23 by two routes. One route is to input the direct current to the high-voltage DC terminal 234 of the power supply 23, and the other another route is to input the direct current to the low-voltage DC terminal 235. The backup power can sustain the operation of the electric appliance for at least three to five minutes so that the data will not be lost during the power outage. As for the selection of the high-voltage DC terminal 234 or the low-voltage DC terminal 235, it depends on the design specification.

The major difference between the conventional backup power-supply device and the present invention is that the latter supplies DC power, but the former supplies AC power. Besides, the backup power-supply device of the present invention sustains supplying power for at least three to five minutes, and thus the cost will be reduced significantly. Therefore, the backup power-supply device of the present invention will be more practical than the conventional backup power-supply device.

The backup power-supply of the present invention includes a charger 211, a rechargeable battery cell 212, a DC/DC converter 213, and a detecting circuit 214. The charger 211 will charge the rechargeable battery cell 212 under the normal power-supply state. The detecting circuit 214 will detect the power-supply state and turn on the DC/DC converter 213 when the power-supply state is interrupted. Hence, the electric energy accumulated in the rechargeable battery cell 212 can be discharged to the high-voltage DC terminal 234 or the low-voltage DC terminal 235 through the DC/DC converter 213. Because the operation sequence of the DC/DC converter 213 has no relation to that of the charger 211, the inverter 215 can be used to separate their operation sequence.

Figure 2B:
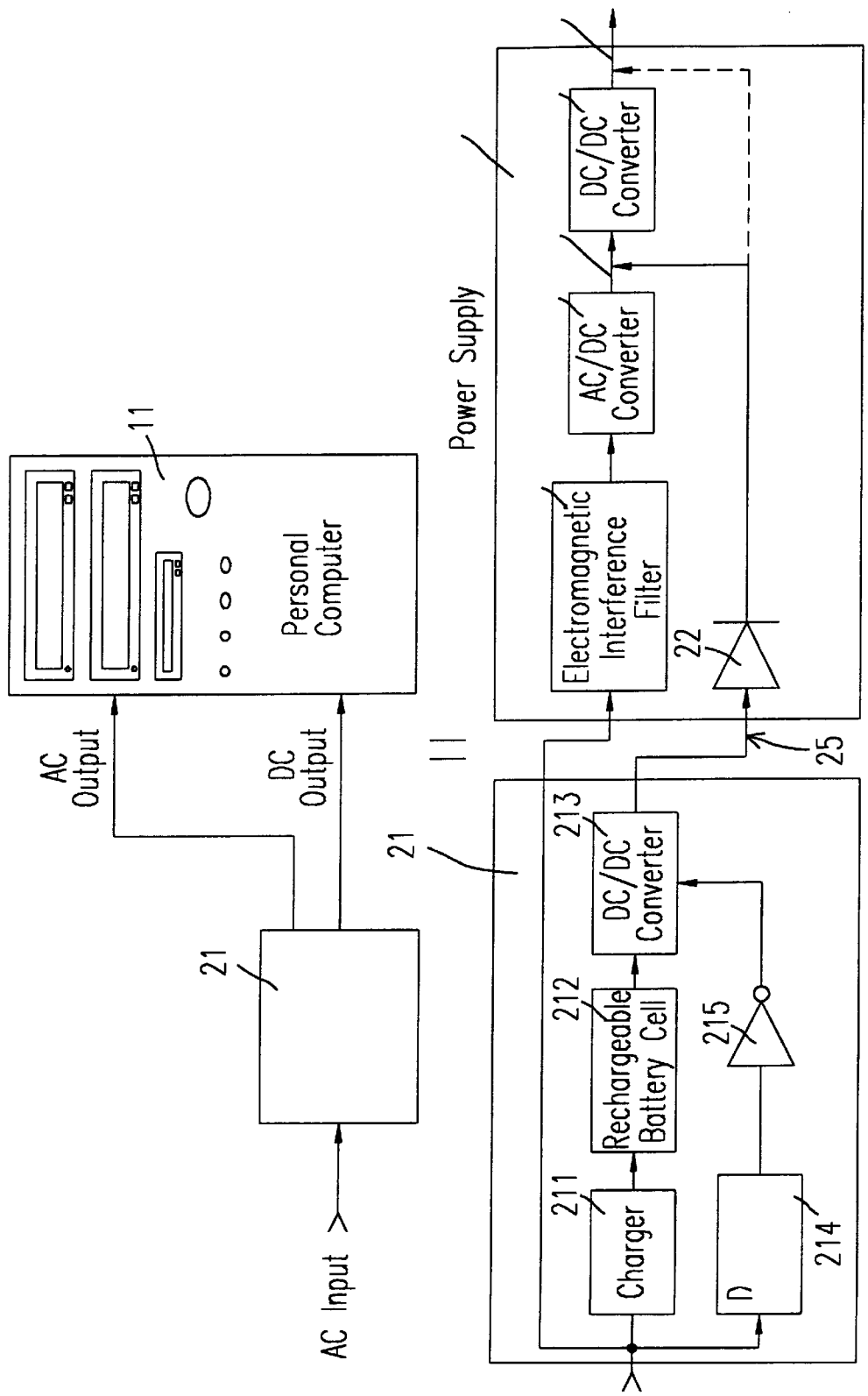
FIG. 2(b) is a block diagram of a backup power-supply of another preferred embodiment according to the present invention connected with the power supply of a PC.

Please refer to FIG. 2(b). The AC input terminal of the power supply 23 is not connected to the external AC input directly as shown in FIG. 2(a), but to the backup power-supply 21 in parallel. Thus, the backup power-supply 21 can output both AC power and DC power to the power supply 23 so that the cost of the conducting wires can be eliminated.

Figure 3:
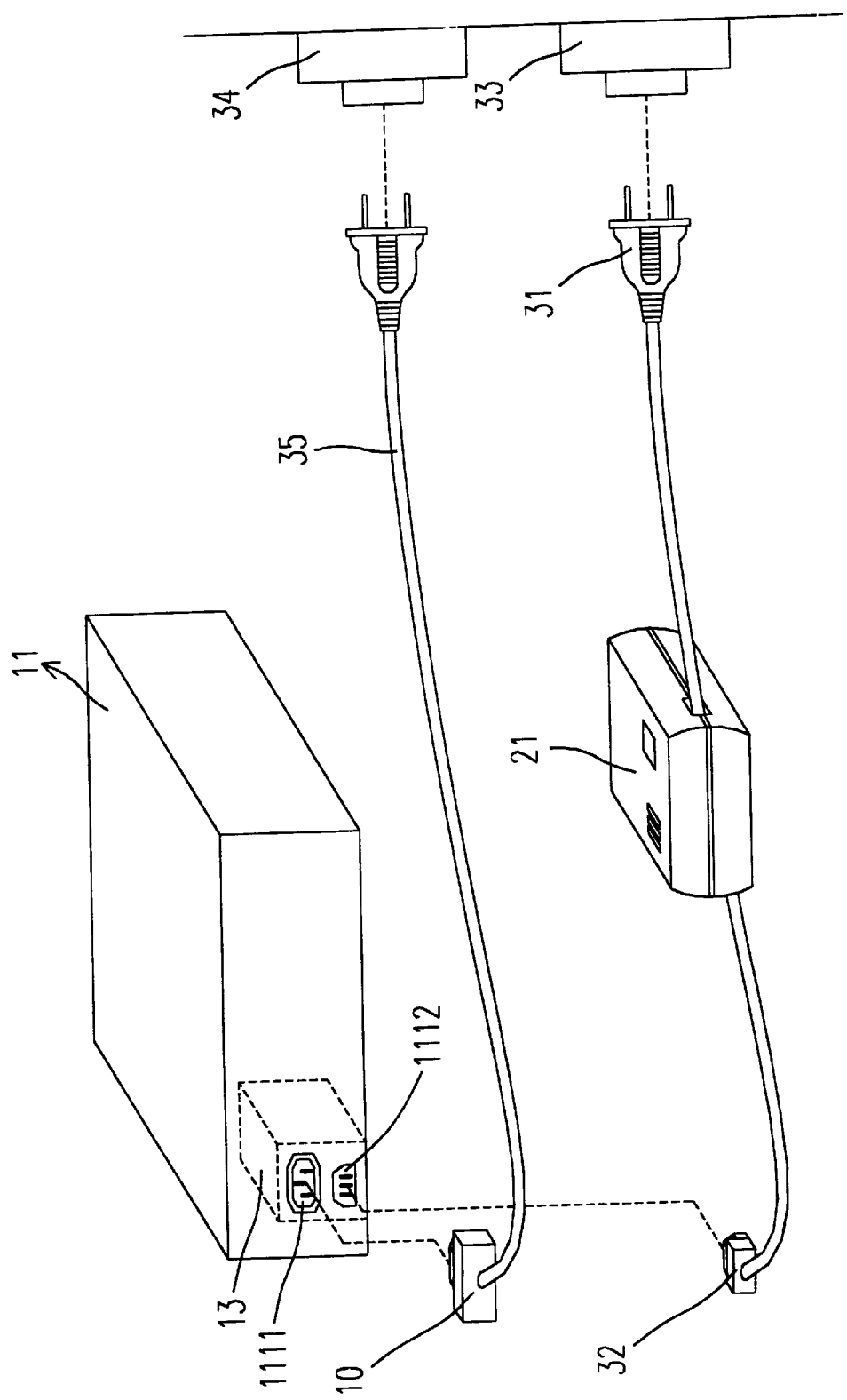
FIG. 3 is a schematic diagram showing how the backup power-supply device of FIG. 2(a) is connected together with the power supply of an electric appliance.

Please refer to FIG. 3 showing how the backup power-supply device of FIG. 2(a) is connected together with the power supply of an electric appliance. The plug 31 is plugged into the outlet 33 of the external power source for receiving the AC power from the external power source. The plug 32 is plugged into the second receptacle 1112 of the PC 11 for supplying the backup power. The plug 10, which is one end of the cable 35, is connected to the first receptacle 1111 of the PC 11. The other end of the cable is connected to the outlet 34 of the external power source for supplying power to the PC under normal power-supply state.

Figure 4:
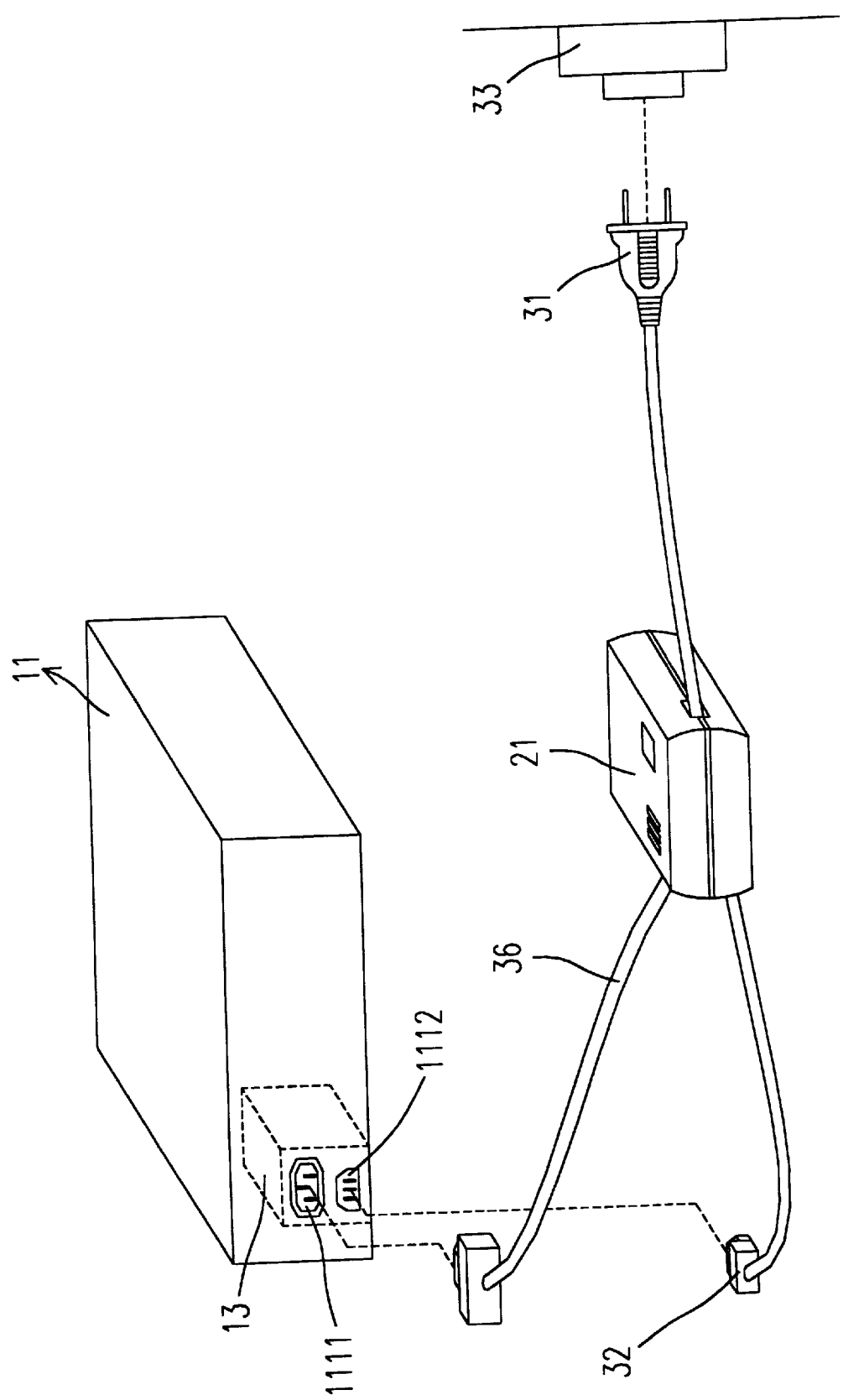
FIG. 4 is a schematic diagram showing how the backup power-supply device of FIG. 2(b) is connected together with the power supply of an electric appliance.

Please refer to FIG. 4 showing how the backup power-supply device of FIG. 2(b) is connected together with the power supply of an electric appliance, in which the first receptacle 1111 of the PC 11 is not directly connected to the outlet of the external power source, but to the second output terminal of the backup power-supply device 21 for receiving AC power indirectly from the backup power-supply device 21. Thus, the cost of the cables can be diminished.

The backup power-supply device of the present invention will not only sustain supplying power to an electric appliance during the power outage, but lower the cost of the backup power-supply. Therefore, the backup power-supply device of the present invention will be cheaper and more practical than the conventional backup power-supply device, While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A backup power-supply device adapted to be used with an electric appliance having a power supply with a first receptacle and a second receptacle, in which said first receptacle receives power from an external power source when said electric appliance is under a normal power-supply state, comprising:
- an input terminal electrically connected to said external power source for receiving power from said external power source;
- an output terminal electrically connected to said second receptacle of said power supply;
- a power-accumulating unit for accumulating the backup power therein when said electric appliance is under said normal power-supply state and releasing said backup power when said external power source fails to supply power;
- a charger electrically connected between said input terminal and said power-accumulating unit for charging said power-accumulating unit when said electric appliance is under said normal power-supply state;
- a DC/DC converter electrically connected between said power-accumulating unit and said output terminal for converting a low-level direct current signal outputted from said power-accumulating unit into a high-level direct current signal provided for said electrical appliance through said output terminal and said second receptacle of said power supply; and
- a detecting circuit electrically connected to said input terminal, said charger, and said DC/DC converter and detecting the power-supply state from said external power source for turning on said DC/DC converter and having said DC/DC converter release said backup power to said electric appliance when said external power source fails to supply power.

2. A backup power-supply device according to claim 1, wherein said power-accumulating unit is a rechargeable battery cell.

3. A backup power-supply device according to claim 1, wherein said external power source is a utility power source.

4. A backup power-supply device according to claim 1, wherein said electric appliance is a personal computer.

5. A backup power-supply device according to claim 4, wherein said personal computer is a desktop personal computer.

6. A backup power-supply device according to claim 1, wherein said second receptacle of said power supply is directly connected to an output terminal of an AC/DC converter built in said power supply.

7. A backup power-supply device according to claim 6, wherein said second receptacle of said power supply is directly connected to an output terminal of a DC/DC converter built in said power supply.

8. A backup power-supply device according to claim 1, wherein said first receptacle of said power supply is directly electrically connected to said external power source by an external conducting wire.

9. A backup power-supply device according to claim 8, wherein said first receptacle of said power supply is an input terminal for said external power source.

10. A backup power-supply device according to claim 1, wherein said power-accumulating unit can sustain releasing said backup power for at least three to five minutes.

11. A backup power-supply device adapted to be used with an electric appliance having a power supply with a first receptacle and a second receptacle, comprising:
- an input terminal electrically connected to said external power source for receiving power from said external power source;
- a first output terminal electrically connected to said second receptacle of said power supply;
- a second output terminal electrically connected to said first receptacle of said power supply;
- a power-accumulating unit for accumulating the backup power therein when said electric appliance is under said normal power-supply state and releasing said backup power when said external power source fails to supply power;
- a charger electrically connected between said input terminal and said power-accumulating unit for charging said power-accumulating unit when said electric appliance is under said normal power-supply state;
- a DC/DC converter electrically connected between said power-accumulating unit and said first output terminal for converting a low-level direct current signal outputted from said power-accumulating unit into a high level direct current signal provided for said electrical appliance through said first output terminal and said second receptacle of said power supply; and
- a detecting circuit electrically connected to said input terminal, said charger, and said DC/DC converter and detecting the power-supply state from said external power source for turning on said DC/DC converter and having said DC/DC converter release said backup power to said electric appliance when said external power source fails to supply power.

* * * * *